US008007763B2

(12) United States Patent
Zones

(10) Patent No.: US 8,007,763 B2
(45) Date of Patent: Aug. 30, 2011

(54) PREPARATION OF MOLECULAR SIEVES USING A STRUCTURE DIRECTING AGENT AND AN N,N,N-TRIALKYL BENZYL QUATERNARY AMMONIUM CATION

(75) Inventor: Stacey I. Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 920 days.

(21) Appl. No.: 11/860,624

(22) Filed: Sep. 25, 2007

(65) Prior Publication Data

US 2008/0075656 A1 Mar. 27, 2008

Related U.S. Application Data

(60) Provisional application No. 60/826,882, filed on Sep. 25, 2006.

(51) Int. Cl.
*C01B 39/04* (2006.01)
*C01B 39/48* (2006.01)
(52) U.S. Cl. ...................................................... 423/703
(58) Field of Classification Search .................. 423/703
See application file for complete search history.

(56) References Cited

U.S. PATENT DOCUMENTS

| | | | |
|---|---|---|---|
| 3,140,249 A | 7/1964 | Plank et al. | |
| 3,140,251 A | 7/1964 | Plank et al. | |
| 3,140,253 A | 7/1964 | Plank et al. | |
| 4,481,173 A * | 11/1984 | Chu | 423/703 |
| 4,544,538 A * | 10/1985 | Zones | 423/706 |
| 4,913,337 A * | 4/1990 | Gotoh | 228/173.6 |
| 5,028,406 A | 7/1991 | Occelli | |
| 5,057,296 A * | 10/1991 | Beck | 423/277 |
| 5,316,753 A * | 5/1994 | Nakagawa | 423/706 |
| 5,558,851 A | 9/1996 | Miller | |
| 5,653,956 A * | 8/1997 | Zones | 423/706 |
| 5,707,600 A * | 1/1998 | Nakagawa et al. | 423/701 |
| 5,783,167 A * | 7/1998 | Corma Canos et al. | 423/701 |
| 5,785,947 A * | 7/1998 | Zones et al. | 423/705 |
| 7,022,308 B1 * | 4/2006 | Yuen et al. | 423/706 |
| 7,597,874 B1 * | 10/2009 | Miller et al. | 423/701 |
| 2006/0062274 A1 * | 3/2006 | Pompei | 374/121 |
| 2006/0062724 A1 | 3/2006 | Yuen et al. | |

OTHER PUBLICATIONS

International Preliminary Report on Patentability for PCT/US2007/079368 mailed Apr. 9, 2009 (6 pages).

* cited by examiner

*Primary Examiner* — David M Brunsman
(74) *Attorney, Agent, or Firm* — Michael D. Ross

(57) ABSTRACT

Crystalline molecular sieves are prepared using a mixture comprising an organic structure directing agent capable of forming the molecular sieve, and an N,N,N-trialkyl benzyl quaternary ammonium cation.

3 Claims, No Drawings

US 8,007,763 B2

PREPARATION OF MOLECULAR SIEVES USING A STRUCTURE DIRECTING AGENT AND AN N,N,N-TRIALKYL BENZYL QUATERNARY AMMONIUM CATION

This application claims the benefit of provisional Application No. 60/826,882, filed Sep. 25, 2006.

BACKGROUND

Crystalline molecular sieves are usually prepared from aqueous reaction mixtures containing sources of alkali or alkaline earth metal oxides sources of silicon oxide, and, optionally, sources of, e.g., boron oxide and/or aluminum oxide.

Molecular sieves have been prepared from reaction mixtures containing an organic structure directing agent ("SDA"), usually a nitrogen-containing organic cation. For example, U.S. Pat. No. 4,963,337, issued Oct. 16, 1990 to Zones, discloses that the molecular sieve designated SSZ-33 can be prepared using a tricyclo[5.2.1.0$^{2,6}$]decane quaternary ammonium cation SDA. U.S. Pat. No. 4,544,538, issued Oct. 1, 1985 to Zones, discloses a molecular sieve designated SSZ-13 which is made using an SDA derived from 1-adamantamine, 3-quinuclidinol, or 2-exo-aminonorbornane. U.S. Pat. No. 5,316,753, issued May 31, 1994 to Nakagawa, discloses a molecular sieve designated SSZ-35 made using an SDA comprising aza-polycyclic ring compounds. U.S. Pat. No. 5,653,956, issued Aug. 5, 1997 to Zones, discloses a molecular sieve designated SSZ-42 made using an SDA comprising a N-benzyl-1,4-diazabicyclo[2.2.2]octane cation or a N-benzyl-1-azabicyclo[2.2.2]octane cation.

A number of zeolite molecular sieves have been synthesized on a small scale that can be used to make potentially, unique catalysts having potentially attractive catalyst properties. An obstacle, to the further development of these materials is the high cost of making large scale quantities of the molecular sieve. The costs are particularly high and prohibitive when relatively large amounts of exotic structure directing agents (also known as templates) are needed to make satisfactory purity molecular sieves. Thus, it is highly desirable and, in fact, critical to develop methods to make commercial volumes of the molecular sieves at significantly reduced per pound cost. This can be done by greatly reducing the cost/amount of the structure directing agent used in the synthesis. The present invention provides a process to allow the synthesis of molecular sieves at greatly reduced cost by replacing some of the structure directing agent with less expensive compounds.

U.S. Pat. No. 5,785,947, issued Jul. 28, 1998 to Zones et al., discloses a method of preparing crystalline zeolites using a small quantity of an organic templating compound and a larger quantity of an amine component containing at least one amine having from one to eight carbon atoms, ammonium hydroxide, or mixtures thereof. It is disclosed that the amine component is preferably an aliphatic or cycloaliphatic amine containing no more than eight carbon atoms. Disclosed examples of the amine component are isopropylamine, isobutylamine, n-butylamine, piperidine, 4-methylpiperidine, cyclohexylamine, 1,1,3,3-tetramethyl-butylamine and cyclopentylamine.

U.S. Pat. No. 5,707,600, issued Jan. 13, 1998 to Nakagawa et al., discloses a process for preparing medium pore size zeolites using small, neutral amines capable of forming the zeolite, the amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom, wherein the process is conducted in the absence of a quaternary ammonium compound. Disclosed examples of the small, neutral amine are is isobutylamine, diisobutylamine, trimethylamine, cyclopentylamine, diisopropylamine, sec-butylamine, 2,5-dimethylpyrrolidine and 2,6-dimethylpiperidine.

U.S. Pat. No. 5,707,601, issued Jan. 13, 1998 to Nakagawa, discloses a process for preparing zeolites having the MTT crystal structure using small, neutral amines capable of forming the zeolite, the amine containing (a) only carbon, nitrogen and hydrogen atoms, (b) one primary, secondary or ternary, but hot quaternary, amino group, and (c) a tertiary nitrogen atom, at least one tertiary carbon atom, or a nitrogen atom bonded directly to at least one secondary carbon atom, wherein the process is conducted in the absence of a quaternary ammonium compound. Disclosed examples of the small, neutral amine are isobutylamine, diisobutylamine, diisopropylamine and trimethylamine.

U.S. Pat. No. 7,022,308, issued Apr. 4, 2006 to Yuen et al., discloses a method for preparing molecular sieve SSZ-33 having a mole ratio of greater than about 15:1 of (1) silicon oxide, germanium oxide and mixtures thereof to (2) boron oxide or a mixture of boron oxide with aluminum oxide, gallium oxide, titanium oxide or iron oxide and mixtures thereof, said method comprising:

A. forming an aqueous reaction mixture comprising (1) a source of silicon oxide, germanium oxide and mixtures thereof; (2) a source of boron oxide or a mixture of boron oxide with aluminum oxide, gallium oxide, titanium oxide or iron oxide and mixtures thereof; (3) a source of alkali metal or alkaline earth metal; (4) an N,N,N-trialkyl-8-ammonium-tricyclo[5.2.1.0$^{2,6}$]decane quaternary ammonium cation, and (5) an N,N-dialkyl-8-amino-tricyclo [5.2.1.0$^{2,6}$]decane compound; and B. maintaining said aqueous mixture under sufficient crystallization conditions until crystals are formed.

SUMMARY OF THE INVENTION

There is provided a method for preparing a crystalline molecular sieve having a mole ratio greater than about 15 of (1) an oxide of a first tetravalent element to (2) an oxide of a trivalent element, pentavalent element, second tetravalent element which is different from said first tetravalent element or mixture thereof, said method comprising:

A. forming an aqueous reaction mixture comprising (1) a source of the oxide of the first tetravalent element; (2) a source of the oxide of the trivalent element, pentavalent element, second tetravalent element which is different from said first tetravalent element or mixture thereof; (3) a source of alkali metal or alkaline earth metal; (4) an organic structure directing agent capable of forming the molecular sieve (hereinafter referred to simply as "SDA"), and (5) an N,N,N-trialkyl benzyl quaternary ammonium cation; and B. maintaining said aqueous mixture under sufficient crystallization conditions until crystals are formed. It should be noted that the phrase "mole ratio greater than about 15" includes the case where there is no oxide (2), i.e., the mole ratio of oxide (1) to oxide (2) is infinity. In that case the molecular sieve is comprised of essentially all oxide (1).

In one embodiment the oxide (1) is silicon oxide, germanium oxide, or mixtures thereof, and oxide (2) is an oxide selected from aluminum oxide, gallium oxide, iron oxide, boron oxide, titanium oxide, indium oxide and mixtures thereof.

The reaction mixture can have a composition in terms of mole ratios falling within the ranges shown in Table A below:

TABLE A

|  | Embodiment 1 | Embodiment 2 |
|---|---|---|
| $YO_2/X_aO_b$ | 5-infinity | 10-infinity |
| $OH^-/YO_2$ | 0.10-1.0 | 0.20-0.30 |
| $Q/YO_2$ | 0.05-0.50 | 0.10-0.25 |
| $M^{n+}/YO_2$ | 0.05-0.30 | 0.05-0.15 |
| $H_2O/YO_2$ | 2-200 | 25-60 |
| $Q/Q + M^{n+}$ | 0.30-0.90 | 0.40-0.60 | where Y is silicon, germanium or a mixture thereof, X is aluminum, boron, gallium, titanium, iron or mixtures thereof, a is 1 or 2, b is 2 when a is 1 (i.e., X is tetravalent), b is 3 when a is 2 (i.e., X is trivalent), M is an alkali metal or alkaline earth metal, n is the valence of M (i.e., 1 or 2), and Q is a mixture of an SDA capable of forming the molecular sieve and an N,N,N-trialkyl benzyl quaternary ammonium cation. As noted above, the $YO_2/X_aO_b$ mole ratio in the reaction mixture is 5 to infinity. This means that there can be no $X_aO_b$ in the reaction mixture. This results in a molecular sieve that is essentially all $YO_2$. As used herein, "essentially all $YO_2$", "essentially all silicon oxide" or "essentially all-silica" means that the molecular sieve's crystal structure is comprised of only $YO_2$ (e.g., silicon oxide) or is comprised of $YO_2$ and only trace amounts of other oxides, such as aluminum oxide, which may be introduced as impurities in the source of $YO_2$.

In one embodiment, the SDA is used in an amount less than that required to fill all of the micropore volume of the molecular sieve, i.e., an amount less than that required to crystallize the molecular sieve in the absence of the N,N,N-trialkyl benzyl quaternary ammonium cation. Typically, the mole ratio of the SDA to the N,N,N-trialkyl benzyl quaternary ammonium cation is about 1:9 and higher, for example about 1:4 to about 4:1.

There is also provided a molecular sieve having a composition, as-synthesized and in the anhydrous state, in terms of mole ratios as follows:

(1 to 5 or higher) Q:(0.1 to 1) $M^{n+}$:$X_aO_b$:(greater than 5) $YO_2$ where Q, M, n, X, a, b and Y are as defined above.

In one embodiment, the as-synthesized molecular sieve is made by a method wherein the SDA is used in an amount less than that required to fill all of the micropore volume of the molecular sieve, i.e., an amount less than that required to crystallize the molecular sieve in the absence of the N,N,N-trialkyl benzyl quaternary ammonium cation. Typically, the mole ratio, of the SDA to the N,N,N-trialkyl benzyl quaternary ammonium cation is about 1:9 and higher for example about 1:4 to about 4:1.

DETAILED DESCRIPTION

Molecular sieves can be prepared by a method comprising preparing an aqueous mixture that contains an SDA capable of forming the molecular sieve and an N,N,N-trialkyl benzyl quaternary ammonium cation. Typically, the mole ratio of the SDA to the N,N,N-trialkyl benzyl quaternary ammonium cation is about 1:9 and higher, for example about 1:4 to about 4:1. Seeds of the molecular sieve may be used in the preparation.

This invention provides considerable cost improvement over the use of an SDA alone.

Molecular sieves can be suitably prepared from an aqueous reaction mixture containing sources of an alkali metal or alkaline earth metal oxide, sources of an oxide of silicon, germanium or mixtures thereof, sources of aluminum oxide, boron oxide, gallium oxide, titanium oxide or iron oxide and mixtures thereof, an SDA and an N,N,N-trialkyl benzyl quaternary ammonium cation. The mixture should have a composition in terms of mole ratios falling within the ranges shown in Table A below:

TABLE A

|  | Embodiment 1 | Embodiment 2 |
|---|---|---|
| $YO_2/X_aO_b$ | 5-infinity | 10-infinity |
| $OH^-/YO_2$ | 0.10-1.0 | 0.20-0.30 |
| $Q/YO_2$ | 0.05-0.50 | 0.10-0.25 |
| $M^{n+}/YO_2$ | 0.05-0.30 | 0.05-0.15 |
| $H_2O/YO_2$ | 2-200 | 25-60 |
| $Q/Q + M^{n+}$ | 0.30-0.90 | 0.40-0.60 | where Y is silicon, germanium or a mixture thereof; X is aluminum, boron, gallium, titanium, iron or mixtures thereof; a is 1 or 2, b is 2 when a is 1 (i.e., X is tetravalent), b is 3 when a is 2 (i.e., X is trivalent), M is an alkali metal or alkaline earth metal; n is the valence of M (i.e., 1 or 2); and Q is a mixture of an SDA and an N,N,N-trialkyl benzyl quaternary ammonium cation.

The reaction mixture is prepared using standard molecular sieve preparation techniques. Typical sources of silicon oxide include fumed silica, silicates, silica hydrogel, silicic acid, colloidal silica, tetra-alkyl orthosilicates, and silica hydroxides. Sources of boron for the reaction mixture include borosilicate glasses and other reactive boron oxides. These include borates, boric acid and borate esters. Sources of other oxides, such as aluminum oxide, gallium oxide, titanium oxide or iron oxide are analogous to those for boron oxide and silicon oxide.

Mixture Q comprises an SDA capable of forming the molecular sieve and an N,N,N-trialkyl benzyl quaternary ammonium cation. Mixture Q can be used to prepare molecular sieves including, but not limited to, those designated SSZ-13, SSZ-33, SSZ-42 and SSZ-35.

SSZ-13

U.S. Pat. No. 4,544,538, issued Oct. 1, 1985 to Zones, discloses a molecular sieve designated SSZ-13 which can be made using an SDA derived from 1-adamantamine. That SDA has the following structure:

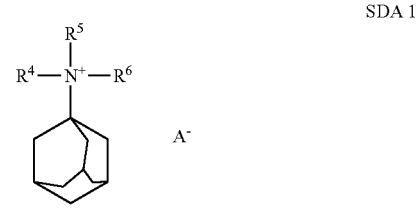

SDA 1 where $R^4$, $R^5$, and $R^6$ are each independently a lower alkyl, for example methyl. The cation is associated with an anion (designated herein by $A^-$ or $X^-$) which is not detrimental to the formation of the molecular sieve. Representative of such anions include halogens, such as chloride, bromide and iodide; hydroxide; acetate; sulfate and carboxylate. Hydroxide is the preferred anion. It may be beneficial to ion exchange, for example, a halide for hydroxide ion, thereby reducing or eliminating the alkali metal or alkaline earth metal hydroxide required.

The following cations may also be used to prepare SSZ-13:

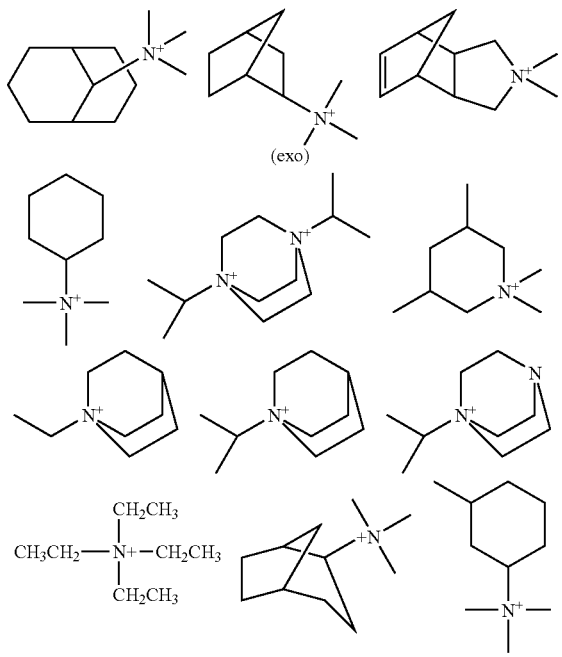

Like SDA 1, each of the foregoing cations is associated with an anion(s) A⁻ which is not detrimental to the formation of SSZ-13.

U.S. Pat. No. 4,544,538 is incorporated by reference herein in its entirety.

SSZ-33

U.S. Pat. No. 4,963,337, issued Oct. 16, 1990 to Zones, discloses that the molecular sieve designated SSZ-33 can be prepared using a tricyclo[5.2.1.0$^{2,6}$]decane quaternary ammonium cation SDA having the formula:

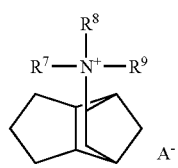

SDA 2 where $R^7$, $R^8$ and $R^9$ are each independently a lower alkyl, for example methyl. The cation is associated with an anion, A⁻, which is not detrimental to the formation of the SSZ-33.

The N,N,N-trialkyl-8-ammonium-tricyclo[5.2.1.0$^{2,6}$]decane quaternary ammonium cation can be synthesized in the manner described in Example 1 of aforementioned U.S. Pat. No. 4,963,337 which is incorporated herein by reference in its entirety.

SSZ-35

U.S. Pat. No. 5,316,753, issued May 31, 1994 to Nakagawa, discloses a molecular sieve designated SSZ-35 made using an SDA comprising aza-polycyclic ring compounds having the formula:

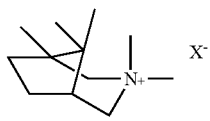

SDA 3

1,3,3,8,8-pentamethyl-3-azonia-bicyclo[3.2.1]octane

U.S. Pat. No. 5,316,753 is incorporated by reference herein in its entirety.

SSZ-42

U.S. Pat. No. 5,653,956, issued Aug. 5, 1997 to Zones, discloses a molecular sieve designated SSZ-42 made using an SDA comprising a N-benzyl-1,4-diazabicyclo[2.2.2]octane cation having the formula:

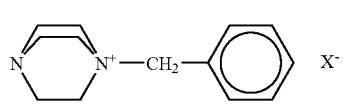

SDA 4

The anion (X⁻) associated with the cation may be any anion which is not detrimental to the formation of the zeolite.

The N,N,N-trialkyl benzyl quaternary ammonium cation has the formula

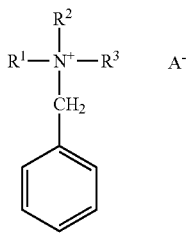

where $R^1$, $R^2$ and $R^3$ are each independently a lower alkyl, for example methyl or ethyl. The cation is associated with an anion, A⁻, which is not detrimental to the formation of the molecular sieve. Representative of such anions include halogens, such as fluoride, chloride, bromide and iodide; hydroxide; acetate; sulfate and carboxylate. Hydroxide is the preferred anion. It may be beneficial to ion exchange, for example, a halide for hydroxide ion, thereby reducing or eliminating the alkali metal or alkaline earth metal hydroxide required.

Mixture Q typically has a mole ratio of SDA to N,N,N-trialkyl benzyl quaternary ammonium cation of about 1:9 and higher, for example about 1:4 to about 4:1.

Use of an N,N,N-trialkyl benzyl quaternary ammonium cation in mixture Q permits a reduction in the amount of SDA used in mixture Q, which results in significant cost savings. In fact, it has been found that, by using an N,N,N-trialkyl benzyl quaternary ammonium cation in mixture Q, the amount of SDA can be reduced to a level below that which is required to fill the micropore volume of the molecular sieve, i.e., an amount less than that required to crystallize the molecular sieve in the absence of the N,N,N-trialkyl benzyl quaternary ammonium cation.

The reaction mixture can be seeded with molecular sieve crystals both to direct and accelerate the crystallization, as well as to minimize the formation of undesired contaminants. Typically, when seeds are employed they are used in an amount which is about 2-3 weight percent based on the weight of silicon oxide in the reaction mixture.

The reaction mixture is maintained at an elevated temperature until crystals of the molecular sieve are formed. The temperatures during the hydrothermal crystallization step are typically maintained from about 140° C. to about 200° C., for example from about 150° C. to about 170° C., or from about 155° C. to about 165° C. The crystallization period is typically greater than 1 day, for example from about 3 days to about 7 days.

The hydrothermal crystallization is conducted under pressure and usually in an autoclave so that the reaction mixture is subject to autogenous pressure. The reaction mixture can be stirred, such as by rotating the reactor, during crystallization. During the hydrothermal crystallization step, the molecular sieve crystals can be allowed to nucleate spontaneously from the reaction mixture.

Once the molecular sieve crystals have formed, the solid product can be separated from the reaction mixture by standard mechanical separation techniques such as filtration. The crystals can be water-washed and then dried, e.g., at 90° C. to 150° C. for from 8 to 24 hours, to obtain the as-synthesized molecular sieve crystals. The drying step can be performed at atmospheric or subatmospheric pressures.

As used herein, the term "as-synthesized" means that the molecular sieve crystals have been recovered from the reaction mixture and still contain the mixture Q in their pores, i.e., the mixture Q has hot been removed from the molecular sieve crystals by (typically) calcination. The molecular sieve has a composition, as-synthesized and in the anhydrous state, in terms of mole ratios as indicated in Table B below:

As-Synthesized Molecular Sieve Composition Table B (1 to 5 or higher) Q:(0.1 to 1) $M^{n+}$:$X_aO_b$:(greater than 15) $YO_2$ where Q, M, n, X, a, b and Y are as defined above. The phrase "(1 to 5 or higher) Q" refers to the fact that, as-synthesized molecular sieves containing higher amounts of $YO_2$ will also contain higher amounts of Q, since the amount of Q is dependent upon the amount of $YO_2$ in the as-synthesized molecular sieve.

The molecular sieves can be used as-synthesized or can be thermally treated (calcined). By "thermal treatment" is meant heating to a temperature from about 200° C. to about 820° C., either with or without the presence of steam. It may also be possible to remove some or all of the SDA from the pores of the product by carrying out extractions with refluxing solvents. Usually, it is desirable to remove the alkali metal or alkaline earth metal cation by ion exchange and replace it with hydrogen, ammonium, or any desired metal ion. Thermal treatment including steam helps to stabilize the crystalline lattice from attack by acids.

Molecular sieves made by the methods disclosed herein are useful in hydrocarbon conversion reactions. Examples of these uses are described in U.S. Pat. No. 4,963,337, issued Oct. 16, 1990 to Zones, which is incorporated herein by reference. They may also be useful in reducing cold start emissions from internal combustion engines.

EXAMPLES

Examples 1-6

Synthesis of Borosilicate SSZ-33 and SSZ-42

2 millimoles of a mixture of an SDA and an N,N,N-trialkylbenzyl quaternary ammonium cation (see the table below for the identity of the SDA and the ratio of SDA to N,N,N-trialkylbenzyl quaternary ammonium cation) are combined with 0.60 grams of Cabosil M5 fumed silica, 0.04 grams of sodium borate decahydrate and a total of water equal to 7 grams. One gram of 1 N NaOH is added. Seeds of SSZ-33, for example, can be added to the SSZ-33 reaction mixture. The reactor is sealed up and the reaction is heated at 160 C with tumbling (43 RPM) for 6-9 days until a crystalline product is obtained.

The same reactions can be carried out with the correct-SDA to make SSZ-42.

Synthesis of Aluminosilicate SSZ-13 and SSZ-35

Mixtures of an SDA and an N,N,N-trialkylbenzyl quaternary ammonium cation (see the table below for the identity of the SDA and the ratio of SDA to N,N,N-trialkylbenzyl quaternary ammonium cation) where the total is 2 mM (and water value is 5.2 grams) are added to a reaction with 2 grams of 1N KOH, 0.05 grams of Reheis F-2000 alumina (~53% Al2O3) and 0.60 grams of Cabosil M5 fumed silica. The SDAs in these reactions are either the adamantane derivative for making SSZ-13 or the piperidine derivative for making SSZ-35. In the case of SSZ-35, it may be advantageous to use 1N NaOH in place of KOH. Again, adding seeds can be advantageous. These reactions are also run at 160 C, 43 RPM for 6-9 days until there is a well-settled product.

| Example | SDA | SDA:R3N + BZ | R = | 1:1 | 1:3 | 1:7 |
|---|---|---|---|---|---|---|
| 1 | SDA 1 | | Methyl | SSZ-13 | SSZ-13 | SSZ-13 |
| 2 | SDA 1 | | Ethyl | SSZ-13 | SSZ-13 | |
| 3 | SDA 2 | | Methyl | SSZ-33 | MTW* | MTW* |
| 4 | SDA 2 | | Ethyl | SSZ-33 | | MTW* |
| 5 | SDA 3 | | Methyl | SSZ-35 | SSZ-35 | |
| 6 | SDA 4 | | Methyl | SSZ-42 | | |

*The reaction mixture did not contain enough SDA 2 to make SSZ-33. MTW was made from the N,N,N-trialkyl benzyl ammonium cation.

What is claimed is:

1. A method for preparing a crystalline molecular sieve having a mole ratio greater than about 15 of (1) an oxide of a first tetravalent element to (2) an oxide of a trivalent element, pentavalent element, second tetravalent element which is different from said first tetravalent element or mixture thereof, said method comprising:
   A. forming an aqueous reaction mixture comprising (1) a source of the oxide of the first tetravalent element; (2) a source of the oxide of the trivalent element, pentavalent element, second tetravalent element which is different from said first tetravalent element or mixture thereof; (3) a source of alkali metal or alkaline earth metal; (4) an organic structure directing agent capable of forming the molecular sieve, and (5) an N,N,N-trialkyl benzyl quaternary ammonium cation; and
   B. maintaining said aqueous mixture under sufficient crystallization conditions until crystals are formed, wherein the molecular sieve is selected from the group consisting of SSZ-13, SSZ-33, SSZ-35 or SSZ-42.

2. A method for preparing a crystalline molecular sieve having a mole ratio greater than about 15 of (1) an oxide of a first tetravalent element, wherein oxide (1) is silicon oxide, germanium oxide, or mixtures thereof, to (2) an oxide of a trivalent element, pentavalent element, second tetravalent element which is different from said first tetravalent element or mixture thereof, wherein oxide (2) is an oxide selected from aluminum oxide, gallium oxide, iron oxide, boron oxide, titanium oxide, indium oxide and mixtures thereof, said method comprising:

A. forming an aqueous reaction mixture comprising (1) a source of the oxide of the first tetravalent element; (2) a source of the oxide of the trivalent element, pentavalent element, second tetravalent element or mixture thereof; (3) a source of alkali metal or alkaline earth metal; (4) an organic structure directing agent capable of forming the molecular sieve, and (5) an N,N,N-trialkyl benzyl quaternary ammonium cation; and B. maintaining said aqueous mixture under sufficient crystallization conditions until crystals are formed, wherein the molecular sieve is selected from the group consisting of SSZ-13, SSZ-33, SSZ-35 or SSZ-42.

3. A molecular sieve having a composition, as-synthesized and in the anhydrous state, in terms of mole ratios as follows:

(1 to 5) Q:(0.1 to 1) $M^{n+}$:$X_aO_b$ (greater than 15) $YO_2$ where Y is silicon, germanium or a mixture thereof, X is aluminum, boron, gallium, titanium, iron or mixtures thereof, a is 1 or 2, b is 2 when a is 1, b is 3 when a is 2, M is an alkali metal or alkaline earth metal, n is the valence of M, and Q is a mixture of an organic structure directing agent capable of forming the molecular sieve, and an N,N,N-trialkyl benzyl quaternary ammonium cation, wherein the molecular sieve is selected from the group consisting of SSZ-13, SSZ-33, SSZ-35 or SSZ-42.

* * * * *